May 5, 1925. 1,536,161
J. M. STRAUB
APPARATUS FOR MAKING CUSHION TIRES
Filed Dec. 19, 1921
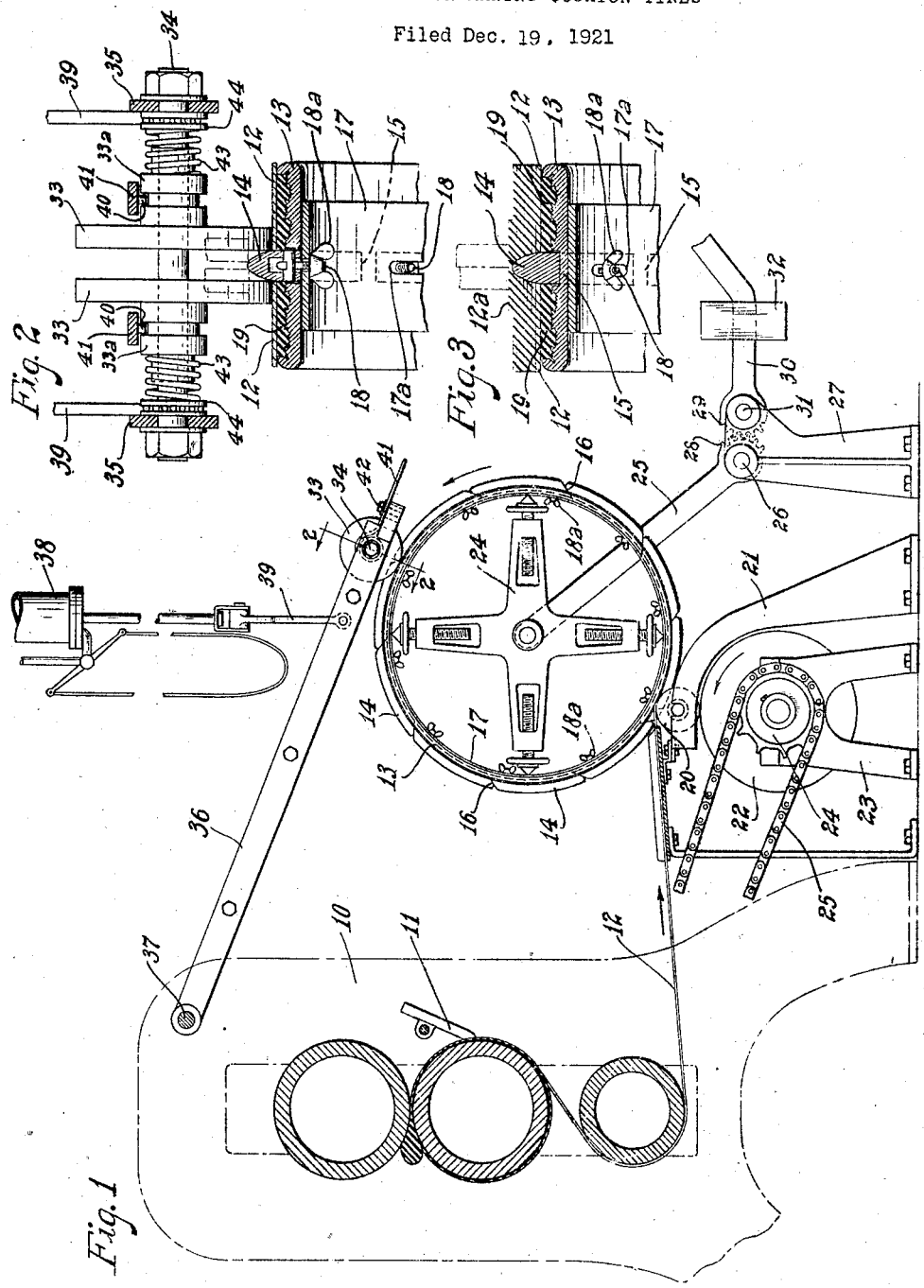
Inventor
John M. Straub.
by Robert M Pierson
Atty.

Patented May 5, 1925.

1,536,161

UNITED STATES PATENT OFFICE.

JOHN M. STRAUB, OF AKRON, OHIO, ASSIGNOR TO THE B. F. GOODRICH COMPANY, OF NEW YORK, N. Y., A CORPORATION NEW YORK.

APPARATUS FOR MAKING CUSHION TIRES.

Application filed December 19, 1921. Serial No. 523,332.

*To all whom it may concern:*

Be it known that I, JOHN M. STRAUB, a citizen of the United States, residing at Akron, in the county of Summit and State of Ohio, have invented a certain new and useful Apparatus for Making Cushion Tires, of which the following is a specification.

This invention relates to apparatus for building vehicle tires wherein a hollow tire-body of plastic rubber is built upon a rigid base member and a core, the latter being removed after the tire-body is built, leaving a cavity within the tire-body.

My object is to provide improved means for compacting the plastic rubber against the tire-base and core and thereby to facilitate production and obtain an improved product.

Of the accompanying drawings:

Fig. 1 is a side elevation, with parts in section, of apparatus embodying a preferred form of my invention, with the work therein.

Fig. 2 is a section on line 2—2 of Fig. 1, showing parts of the apparatus in one stage of the tire-building operation.

Fig. 3 is a similar view showing a later stage.

Referring to the drawings, 10 is a calender of usual construction provided with the usual slitting knives, one of which is shown at 11 (Fig. 1), for supplying strips of rubber 12, 12, to be wound onto a tire-base 13 in building the part of the tire-body adjacent the cavity or cavities therein. The tire-base 13 is preferably integral and formed with a series of radial openings or slots therethrough in which are mounted core-members 14, 14 constituting, as here shown, a complete annular core structure, the slots being separated by bridges, 15, 15, (Fig. 3), and each core section being notched at one end on its inner periphery and thus adapted to overlap one of said bridges. The core members may be formed with oblique end faces, as indicated at 16, (Fig. 1), in order that each may be withdrawn from the finished tire through the slot in the tire-base 13, although when assembled they form a complete annular core structure. A ring 17 may be mounted in the tire-base and the core members secured thereto by bolts 18, 18, provided with wing nuts $18^a$, $18^a$, said bolts being anchored to the core members and extending through slots $17^a$, $17^a$ in said ring. 19 is a layer of hard-rubber compound upon the tire-base 13 for securing the tire-body to the tire-base.

For supporting and rotating the tire-base 13 I preferably employ a supporting and pressing roller 20 (Fig. 1), formed with a waist to accommodate the core-members 14, said roller being journaled in vertical slots formed in an overhanging standard 21 and peripherally supported and driven by a roll 22 thereunder journaled in end standards, one of which is shown at 23, the roll 22 being driven by a sprocket 24 and chain 25 from the calender 10.

The tire-base 13 is held in position upon the roller 20 by a spider 24 the arms of which engage the ring 17, said spider being loosely journaled at the free end of an arm 25 of which the opposite end is pivoted at 26 to a standard 27 and formed with a gear-segment 28 meshed with a gear segment 29 formed on a lever 30 pivoted at 31 on the standard 27 and provided with a weight 32 for pressing the tire-base 13 against the roller 20.

For pressing the rubber strips 12 adjacent the core-members 14, I provide a pair of presser rollers 33, 33, which as here shown are slidably journaled upon a shaft 34 extending transversely between the arms 35, 35 of a vertically swinging frame 36 pivoted at 37 upon the calender 10, the rollers 33 being thus adapted to be lowered onto and raised from the tire-base 13, for which movement I provide an overhead fluid-pressure hoist 38 connected with the frame 36 by a yoke 39.

The rollers 33 are formed with plane faces on their adjacent sides and the opposite side of each is formed with a circumferentially grooved hub member $33^a$, in the groove of which is mounted a stud 40 upon the end of a shipper lever 41, the latter being pivoted, as at 42, upon the front end of the frame 36. 43, 43 are helical springs surrounding the shaft 34 and interposed between roller thrust-bearings 44, 44 and said hub-members, being thus adapted to rotate about the shaft 34 with the rollers 33 and yieldingly press the latter toward each other.

In the operation of the apparatus, the tire-base 13, ring 17 and core members 14 are assembled, as shown in Figs. 2 and 3, and the layer 19 of hard rubber compound is placed thereon in any known or suitable manner.

This assembly is then mounted upon the spider 24 and therewith lowered, by means of the lever 30, onto the waisted supporting and pressing roller 20, which meanwhile is being driven by the roll 22, sprocket 24 and chain 25 from the calender. Strips of rubber 12 are then brought from the calender and started upon the tire-base, one on each side of the core-members 14, adjacent the roller 20, which roller drives the tire-base, thus drawing the rubber strips from the calender, and presses them onto the tire-base. The hoist 38 is then used to lower the rollers 33 onto the tire-base, said rollers being spread apart by hand, against the springs 43, by the shipper levers 41, to straddle the core-members 14, which thereafter hold them apart.

As the strips 12 pass under the rollers 33 their inner margins are pressed by said rollers onto the hard rubber layers 19 and onto each other in successive superimposed convolutions, the springs 43 causing the rollers to hug the core-members 14, while the tire-body is built up over the rounded outer portions of the core-members. When the rollers 33 are eventually forced upward to the outer periphery of the core members 14 by the enlarging tire-body their plane faces are forced against each other by the springs 43, as shown by the dot-and-dash lines in Fig. 3. One of the strips 12 is then discontinued from the calender and the other is guided by hand onto the middle part of the work, as indicated at 12ª (Fig. 3), while the tire-base continues to be rotated, and the rollers 33 press it in place over the crown of the core-members. After one or more convolutions have thus been applied, the strip is severed and the base 13, with the partly constructed tire thereon, is then removed from the spider and the rest of the tire-body is built thereon by any known or suitable apparatus and method.

In my improved apparatus the rollers 33 press the tire building material firmly about the entire exposed surface of the core-members notwithstanding the curved cross-sectional form of the latter, while the roller 20 presses said material substantially throughout its width. Rapid production and an improved product is obtained.

The procedure described herein is a part of the subject matter of my method Patent No. 1,495,362, granted May 27, 1924.

Details of construction may be modified without departing from the scope of my invention, and I do not wholly limit my claims to the specific construction shown.

I claim:

1. Apparatus for making cushion tire-bodies comprising a tire-base, a substantially continuous, obliquely-faced, annular core-structure upstanding from the outer periphery thereof, a presser roller adapted to run upon the work at one side of said core-structure, and yielding means for urging said roller toward the axis of the tire-base and against the side of said core structure.

2. Apparatus for making cushion tire-bodies comprising a tire-base, a core-structure extending from the outer periphery thereof, a pair of presser rollers straddling said core-structure, and yielding means for pressing said rollers toward each other against said core-structure.

3. Apparatus for making cushion tire-bodies comprising a tire-base, a core-structure extending from the outer periphery thereof, a pair of presser rollers straddling said core-structure, yielding means for pressing said rollers toward each other, and manually operable means for spreading said rollers apart against the action of said yielding means.

4. Apparatus for making cushion tire-bodies comprising a tire-base formed with radial slots therethrough, core members mounted in said slots and constituting an annular core-structure on the outer side of said base, a pair of presser members straddling said core structure, and yielding means for urging said presser members toward each other.

5. Apparatus for making cushion tire-bodies comprising a tire-base, an annular core-structure of curvilinear cross-sectional form extending from the outer periphery thereof, a pair of parallel, axially aligned presser rollers straddling said core-structure and having plane faces adjacent each other, and yielding means for urging said rollers toward each other.

6. Apparatus for building cushion tire-bodies comprising a tire-base, a core-structure extending from the outer periphery thereof, a shaft extending transversely of said base, means for holding said shaft in operative position with respect to said base, a pair of presser rollers slidably journaled on said shaft, and yielding means for urging said rollers along said shaft toward each other.

7. Apparatus for making cushion tire-bodies comprising a tire-base, a core-structure extending from the outer periphery thereof, a shaft extending transversely of said base, a presser roller slidably journaled on said shaft, a thrust-bearing member journaled on said shaft, and a helical spring surrounding said shaft and interposed between said thrust-bearing member and said roller.

8. Apparatus for making cushion tire-bodies comprising a tire-base, a core-structure extending from the outer periphery thereof, a shaft extending transversely of said base, a presser roller slidably journaled on said shaft, and a shipper lever for sliding said roller on said shaft.

9. Apparatus for making cushion tire-bodies comprising a tire-base, a core-structure extending from the outer periphery thereof, a pivoted member adapted to be swung in the plane of said base, a shaft secured to said pivoted member and extending transversely of said base, a presser roller slidably journaled on said shaft, and a shipper lever for said roller fulcrumed on said pivoted member.

10. Apparatus for making cushion tire-bodies comprising a tire-base, a core-structure extending from the outer periphery thereof, means for supporting and rotating said base, means for supplying strips of tire building material to said base, a pair of presser rollers straddling said core-structure, and yielding means for urging said rollers toward each other against said core-structure.

In witness whereof I have hereunto set my hand this 16 day of December, 1921.

JOHN M. STRAUB.